June 29, 1943.  G. H. EVANS  2,322,838
DISPLAY SIGN
Filed March 6, 1939  5 Sheets-Sheet 1

Inventor
George H. Evans
By Stevens & Davis
Attorneys

June 29, 1943.  G. H. EVANS  2,322,838
DISPLAY SIGN
Filed March 6, 1939  5 Sheets-Sheet 2

Inventor
George H. Evans
By Stevens & Davis
Attorneys

June 29, 1943. G. H. EVANS 2,322,838
DISPLAY SIGN
Filed March 6, 1939  5 Sheets-Sheet 3

Inventor
George H. Evans
By Stevens and Davis
Attorneys

June 29, 1943.　　　G. H. EVANS　　　2,322,838
DISPLAY SIGN
Filed March 6, 1939　　　5 Sheets-Sheet 5

Inventor
George H. Evans
By Stevens & Davis
Attorneys

Patented June 29, 1943

2,322,838

UNITED STATES PATENT OFFICE 2,322,838

DISPLAY SIGN

George H. Evans, Washington, D. C., assignor of one-half to Richard K. Stevens, Washington, D. C.

Application March 6, 1939, Serial No. 260,192

3 Claims. (Cl. 40—133)

This application is a continuation in part of the copending application entitled "Display sign," U. S. Patent No. 2,214,412 granted September 10, 1940 to George H. Evans.

This invention relates to advertising devices and more particularly to display signs having means for causing the motion of a light pattern.

Heretofore in the designing of advertising mediums it has been a well recognized fact that a display sign including motion is more attractive than one which is motionless. Consequently, many types of displays, which have incorporated various moving parts, have been produced in an effort to attract the attention of the potential buyer. The motion has been of various types and has included many different kinds of moving parts. Reflecting media has been extensively used in an effort to simulate various types of motion. The vast majority of these signs, however, are not particularly attractive, nor have they incurred any considerable amount of success. The failure of these signs has been due to many reasons such as their appearance, or due to the cost of the sign and/or the expense of operation or to the number of working parts which may readily become disorganized. Furthermore, many signs are so irritating to the eyes that an observer cannot read the sign even though it may attract his attention.

In view of the above situation the object of the present invention is to provide an advertising sign and/or display device that presents an illuminated design or light pattern that is caused to move in a manner such that it will attract the attention of the public. In addition this invention contemplates means for presenting a movement of light so that the physical shape of the means for causing the light pattern is disguised to present a sparkling, bubbling and/or scintillating effect. Furthermore, the light, motion or image causing means is adapted to provide the maximum amount of light with the minimum of material so that these devices may be constructed and operated at low cost and may be attractive and readily visible in practically all degrees of light. Though this illuminated effect has a great attracting power, it is not irritating to the eyes and consequently the observer's attention is not only gained but retained sufficiently to cause him to read the sign.

According to the preferred embodiment of this invention, a movable reflecting medium is provided in back of an optically effective screen in such a manner that this reflecting medium may receive light from any desired source and direct the light rays through the screen. Either the reflecting means or the optically effective screen or both may be so fashioned that they will divide these light rays into a plurality of rays, and distort and/or disguise the reflected image. The preferred type of reflecting medium comprises a relatively flat sheet of reflecting material such as metal foil, the reflecting surface of which is formed so as to present a plurality of minute reflecting faces which lie at various angles with respect to each other. By the use of such a reflecting surface light may be received from substantially any direction and may be reflected in a predetermined direction and through the optically effective screen.

The reflector may be moved in any desired manner as by rotation, oscillation, or the like, and it may be positioned parallelly or at an angle to the screen. Likewise other forms of reflectors may be used such as drum-shaped members or the like. The screen may be composed of any desirable medium but preferably it comprises a glass plate, at least one side of which is serrated or undulating to form a plurality of optically effective elements on said surface. These optically effective elements may be in the form of prisms, lenses of positive or negative character which are geometrical in shape and location or may be irregular as in the so-called "hammered glass," or "Diffusex" or other forms of goffering which are capable of forming optical images. In addition, the formations may vary in size or shape, progressively or otherwise, particularly when the screen and reflector are angularly spaced. A light source may be positioned with respect to the reflecting medium and the optically effective screen so as to present the desired illuminated effect and the maximum amount of light. The light source may be positioned within the housing of the sign or in front of the screen and, if desired, shielded by a cover which may carry indicia or the like. The light source may be in the form of ordinary incandescent bulbs, neon tubes, or the like. If desired, the light source may be omitted, whereby the light pattern will depend purely upon incidental light to cause the reflection through the screen.

The invention both as to its organization and method of operation, together with additional objects and advantages, will best be understood from the following description of the specific embodiments when read in connection with the accompanying drawings, wherein like reference characters indicate like parts throughout.

Figures 1, 3, 4, 5:
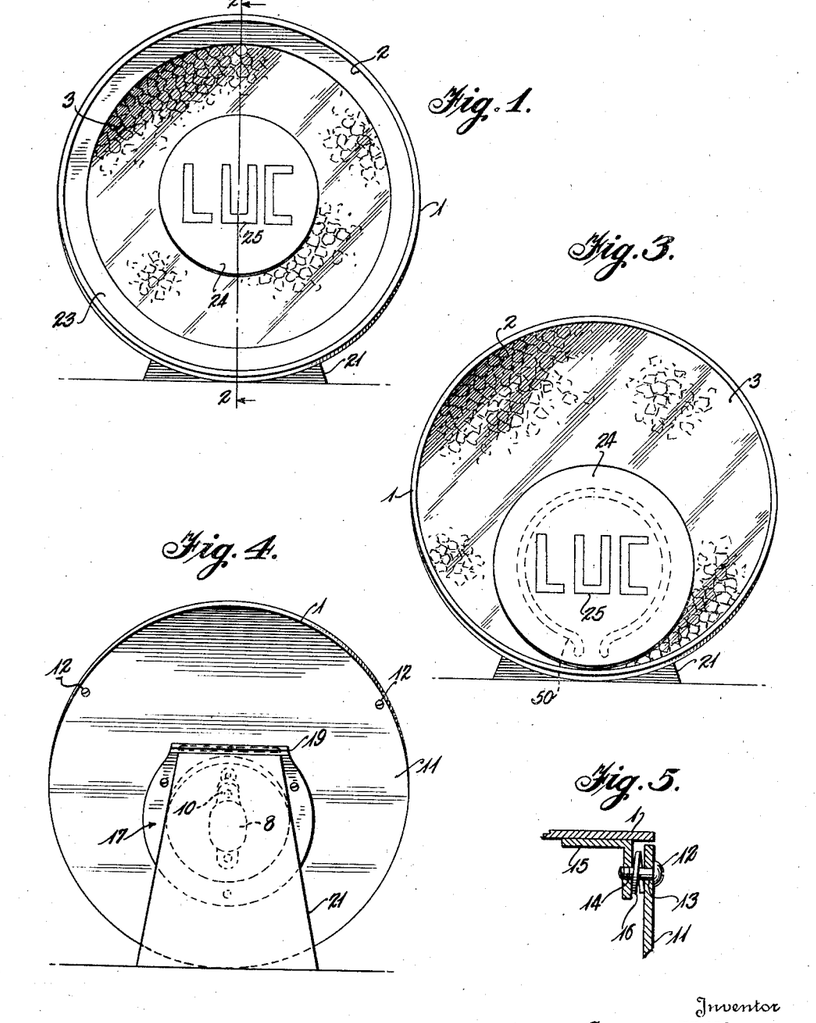
Figure 1 is a front view in elevation of the preferred embodiment of the display sign.
Figure 3 is a front view in elevation of a modified form of display sign.
Figure 4 is a rear view in elevation of the display sign.
Figure 5 is a detailed view in cross-section illustrating the means for adjustably joining the walls of the housing.
Figures 2, 6:
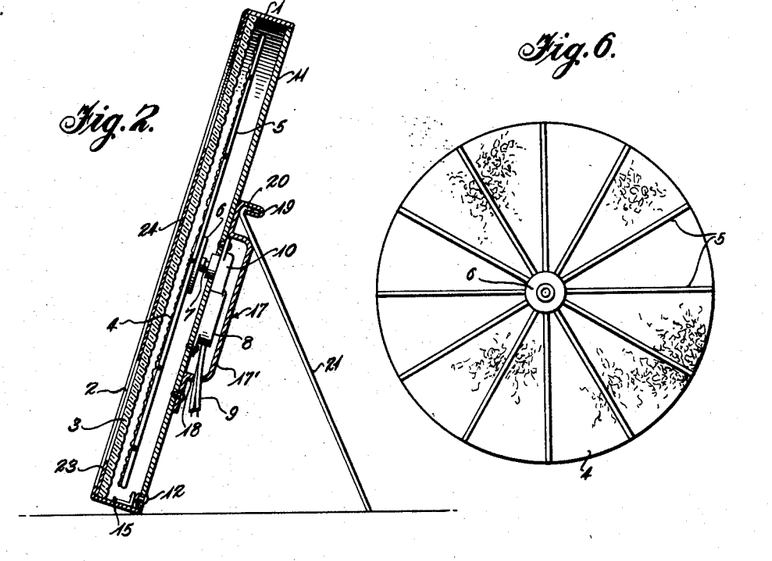
Figure 2 is a view in cross-section taken along line 2—2 of Figure 1.
Figure 6 is a rear view in elevation of the reflecting medium.

With specific reference to the drawings the present invention may comprise a housing 1 having an opening 2 in the front thereof, within which an optically effective screen 3 may be located. Within the housing 1 and in back of the screen 3, a reflector 4 is parallelly spaced from said screen 3. The reflector 4 is mounted upon a spider 5 as best shown in Figure 6, and the hub of this spider 5 is secured to the shaft 7 of a motor 8. The motor 8 may be of any desired type, but is preferably a synchronous electric motor, such as used in electric clocks, and may be provided with an electric conducting means 9 to be connected to any convenient source. As it is preferred that the reflector should rotate at a comparatively slow and predetermined speed, a gear reduction means 10 may be associated with the motor 8.

The motor 8 may be secured to the rear wall 11 of the housing 1 in any convenient manner so that the reflector 4 which is mounted upon the shaft 7 of the motor will be parallelly spaced from the screen 3 when the rear wall is secured in position. As there may be some slight deviations from the parallel, it is preferred that this rear wall 11 may be adjustably mounted so that its position may be varied slightly in order to adjust the plane in which the reflector 4 will lie. Accordingly, this rear wall 11 may be secured at three equally distant points by screws 12.

As best shown in Figure 5, the screws 12 may pass freely through apertures 13 in the wall 11 and into threaded apertures 14 within angle brackets 15 which may be spot welded or otherwise secured to the housing 1. Springs, such as spring washers 16, may be positioned between the rear wall 11 and the brackets 15 so that said wall 11 will be resiliently urged away from said brackets 15. Accordingly, when the rear wall is secured in position the screws 12 may be adjusted so that the reflection image received from the reflector 4 through the screen 3 will be substantially even over the entire surface thereof, and of the proper type.

In order to permit a light-weight construction, the rear wall 11 is made from a relatively thin sheet of material. As this sheet is apt to warp slightly, it is preferred to strengthen it by a reinforcing member 17. The reinforcing member 17 may comprise a light-weight material that is dished or otherwise formed to provide angularly extending side walls 18 which form a rigid brace to prevent the warping of the rear wall 11. Consequently, the member 17 may not only reinforce the rear wall 11 but also form a housing 17' for the source of power 8. In addition, the top edge of the reinforcing member 17 may be bent over to form a U-shaped slide 19 which is adapted to receive the angularly bent tongue 20 of a supporting member 21. The supporting member 21 may extend rearwardly and downwardly at an angle, and is preferably widened at its base as best shown in Figure 4, so as to rigidly support the sign. The tongue 20 may be slidably received by the U-bracket 19 so that the supporting member 21 may be removed to permit the formation of a compact package for shipment.

A mask 23 may be located adjacent the screen 3 to prevent the perception of the area between the edge of the reflector 4 and the housing 1. In other words, regardless of the angle from which the sign is observed the whole surface of the screen will be illuminated by the reflection from the reflector 4. Due to the fact that the reflector 4 is rotated at a relatively low speed, there is no clearly perceptible dead spot in the center as compared to an accelerated movement of the image around the edges of the sign. As there is a slight difference, however, it is preferred to cover this center portion with a mask 24.

In addition to acting as a mask to this center portion the member 24 may also bear advertising matter or insignia 25. The insignia 25 may be inscribed upon the mask 24 in any desired manner or may comprise cut out portions so that the illuminated image from the reflector may be visible in the spaces forming letters or other type of designs. The mask 24 need not be opaque but may be translucent, or even transparent and of a colored material so as to produce an attractive color contrast. The member 24 may be located in any desired position and is shown in Figure 1 as being in the exact center of the sign, and in Figure 2 as being tangent to the lower circumference of the sign.

Very desirable effects may be obtained by the combination of one or more of these movable reflectors with a suitable background and/or an optical screen. The screen may be varied in its formation according to the type of light pattern and effect it is desired to obtain. The choice of screen is also influenced by other conditions such as the eventual location of the sign, the direction from which the sign will be observed, the amount of light incorporated with the sign or surrounding the sign, and for many other reasons. Although glass plates have been found to give the best type of image, plates made from many other materials are suitable, such as those produced from various types of plastic materials which are transparent or translucent.

Figure 7:
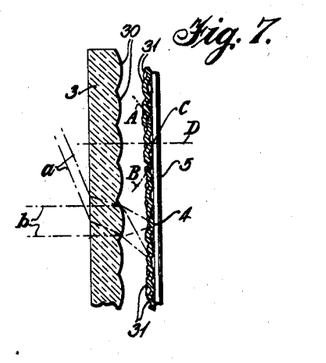
Figure 7 is an enlarged detailed view in cross-section of the diffusing screen and reflecting medium.
Figure 8:
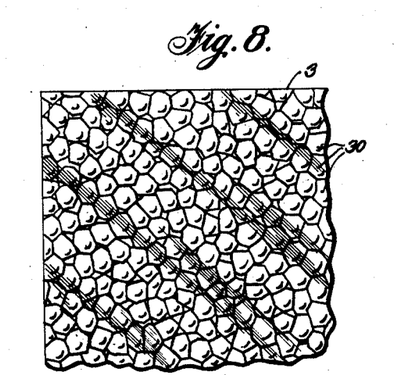
Figures 8, 9, 11 and 13 are fragmentary detailed views of the surfaces of screens particularly suitable for incorporation in the present invention.

A screen that is most satisfactory in the light pattern produced is shown in Figures 7 and 8. This screen comprises a sheet of glass that is commonly called "hammered glass." In looking at this glass it has an appearance similar to hammered metal or to a cobblestone pavement. Actually, one side of the glass has an undulating surface comprised by a plurality of comparatively flat lens elements 30 of relatively irregular design and are closely located next to each other without clear lines of demarcation therebetween. A sign incorporating this type of screen presents a most desirable effect in that the light pattern is particularly sparkling and scintillating. In addition, a liquid effect is often produced according to the type of reflector and source of light which are used.

The lens elements 30 are preferably of such formation as to substantially collimate the light rays passed therethrough. For instance, a point of light reflected at an acute angle, as shown in Figure 7, will be directed through a lens element 30 which will collimate the light rays $a$ projected thereby. Similarly, an image projected perpendicularly to the screen may likewise be collimated by the same element 30 to produce the light rays $b$. By such means, the images are substantially sharply defined so as to produce a sparkling and scintillating effect rather than a diffused or vibrating effect.

Figure 9:
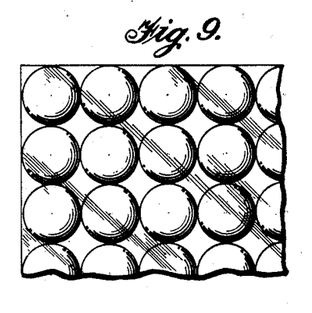
Figure 10:
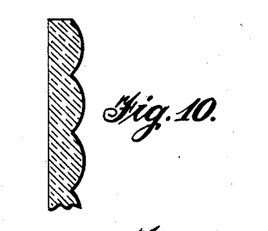
Figures 10, 12 and 14 are fragmentary views in cross-section of the screens shown in Figures 8, 9, 11 and 13.

Another type of screen which may be used is shown in Figures 9 and 10. This screen comprises a sheet having a plurality of lenses extending from at least one surface thereof and located adjacent each other in a geometrical arrangement. This formation is commonly called a lenticulated glass. The lenticulated screen produces a light image that appears to comprise a plurality of sparkling bubbles. Due to the fact that the lens elements extend well away from the surface of the glass, the light pattern is clearly visible at acute angles with respect to the screen as with the prismatized glass. In addition, the images are distinct at greater distances than with the flatter lenses.

Figure 11:
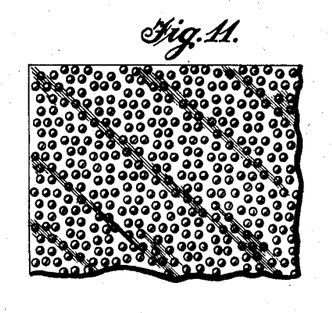
Figure 12:
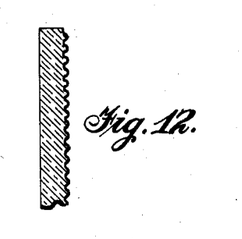

Still another type of screen which is known as the "Diffusex" glass is shown in Figures 11 and 12. One surface of this glass is formed into a plurality of very small irregular lens elements which presents a pebbly effect. These irregular formations are so close together that the glass has rather a smoky appearance. When used in combination with the hereinbefore described reflecting members, the light pattern produced thereby has a diffused bubbly or smoky effect which completely disguises the physical conformation of the means for producing these light patterns.

Figure 13:
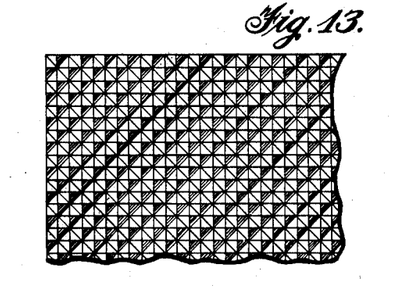
Figure 14:
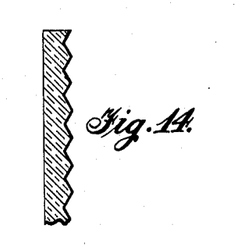

The type of screen shown in Figures 13 and 14 comprises a screen having at least one surface formed into a plurality of prisms located next to each other. When this type of screen is combined with the unique reflecting members hereinbefore described, a light pattern comprising a plurality of sparkling, starry formations is produced. In addition, this screen has an advantage in that the prisms, particularly if located on the outer surface, deflect the light to acute angles and consequently the pattern is clearly distinguishable to observers who are located to one side of the sign. This type of screen is commonly called a prismatized glass.

Additional types of screens may be used for other effects according to the purpose of the sign. A screen may be lenticulated or prismatized on both sides, for instance, or may be goffered, corrugated, or otherwise deformed on one or both surfaces so as to diffuse and/or refract the light directed therethrough by a reflector. Another form of screen that produces a very unique effect may comprise the well known glass bricks. The glass bricks are particularly suitable for large outdoor displays.

The reflector 4 is preferably made from metal foil so as to permit a light-weight construction which may be driven by the small synchronous motors at a relatively small cost. The foil sheet which comprises the reflector 4 is formed in such a manner as to produce a plurality of small reflecting faces 31 which are more or less irregular in their formation and position and particularly in their angular relation with each other. This reflector is best formed by crumpling a sheet of foil so as to produce these minute reflecting facets 31, and then smoothing the sheet out so as to produce a relatively flat member. The reflecting facets 31 are positioned in such a manner as to receive light rays from substantially all angles and to reflect the light rays through the screen 3 so that they are visible at substantially all angles. In other words, regardless of the angle from which the sign may be observed, the reflected image from the minute facets 31 of the reflector will be visible through the screen 3. Because there are a vast number of these facets 31 which are faced in practically all directions, a sufficient number of the light rays will be directed to the screen 3 at an angle less than the critical angle to illuminate a substantial majority of the optically effective formations, such as the lenses 30, so that the whole screen appears to be brilliantly illuminated.

Due to the fact that the image reflected by these minute reflecting facets 31 passes each of the lens elements 30 of the screen but momentarily and the angle of the reflected image is constantly varied, the illuminated image observed on the face of the screen 3 comprises a sparkling, scintillating effect rather than a clearly defined image. Furthermore, it has been found that by locating the reflector 4 within certain predetermined limits from the screen 3, that a superior image is obtained which is visible at greater angles. These limits may best be defined as the points of focus of the lens elements on the screen directly on the optical axis thereof and at the focal point substantially on the critical angle, beyond which an optical image is not formed.

By locating the points of focus in each individual lens, a curved line A will be described surrounding the surface of each lens 30 until a point B is reached, substantially on the critical angle, beyond which point focusing is virtually impossible. This point B forms one limit of the distance and comprises the nearest point at which the reflector 4 should be located with respect to the screen 3. In this position the reflected image is the most clearly defined at an acute angle with respect to the screen 3, but is not so desirable when viewed directly from the front. On the other hand, if the reflector 4 is moved back until the front surface is substantially in a plane of the point of focus C on the optical axis D of each lens, the image is the most sharply defined when viewed directly from the front.

At the rearmost position of the reflector 4, however, the angular visibility of the image is comparatively poor, just as the direct visibility of the image is comparatively poor when the reflector 4 is located close to the screen. Consequently, by locating the reflector in a plane midway between these two points B and C of focus, a good image is obtained at substantially all angles. It is preferred to position the reflector 4 so that the rearmost facets 31 lie substantially at or just within the axial focal points C. This is partially caused by the depth of focus of the lens elements 30 and partially due to the undulating form of the reflector 4 which provides portions of the surface substantially in critical focus at both limitations. While this description has been specifically directed to the lens elements 30, the same holds true for the other optical formations.

Figure 15:
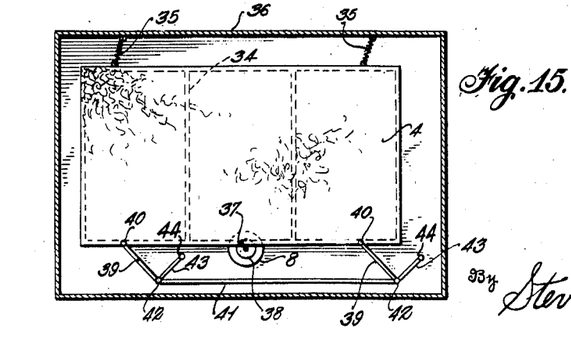
Figure 15 is a front view in elevation of a sign provided with an oscillating reflector, the screen being removed to show the driving and guiding means.

While the reflector 4 has been described as being made of metal foil, other materials are suitable which may comprise heavier members. Furthermore, the reflecting surface may be more or less regularly formed to simplify production. Other changes may be effected provided that an undulating reflecting surface is produced which has a majority of the surface located at an angle with respect to the general plane thereof. While these reflecting faces 31 may be produced by curved formations, it has been found that the most desirable effect is obtained from a reflector having a sharp angular definition between the facets 31 of its surface. The reflector 4 is not limited to a rotating movement as heretofore described but may be moved about in other desired manners. For instance, as shown in Figure 15, the reflector 4 may be oscillated in a plane. The reflector 4 may be supported on a frame 34 which is resiliently suspended by helical springs 35 from the top wall of the housing 36. A pivot 37 or the like carried by the frame 34 may be eccentrically connected to the drive wheel 38 of the motor 8, so that as the wheel 38 rotates, the pivot 37 and the reflector 4 will be oscillated. The supporting springs 35 will permit this movement of the reflector 4, which may be guided by a linkage comprising arms 39 which are pivotally secured to the frame 34 by pins 40 and to each other by a link 41 by pins 42. Arms 43, which are pivotally mounted on pins 44 supported by the housing 36, are also pivotally connected to said pins 42. By this arrangement the reflector is readily guided through an oscillatory motion without danger of becoming jammed or stuck in any manner.

Figures 16, 17, 18, 19, 20:
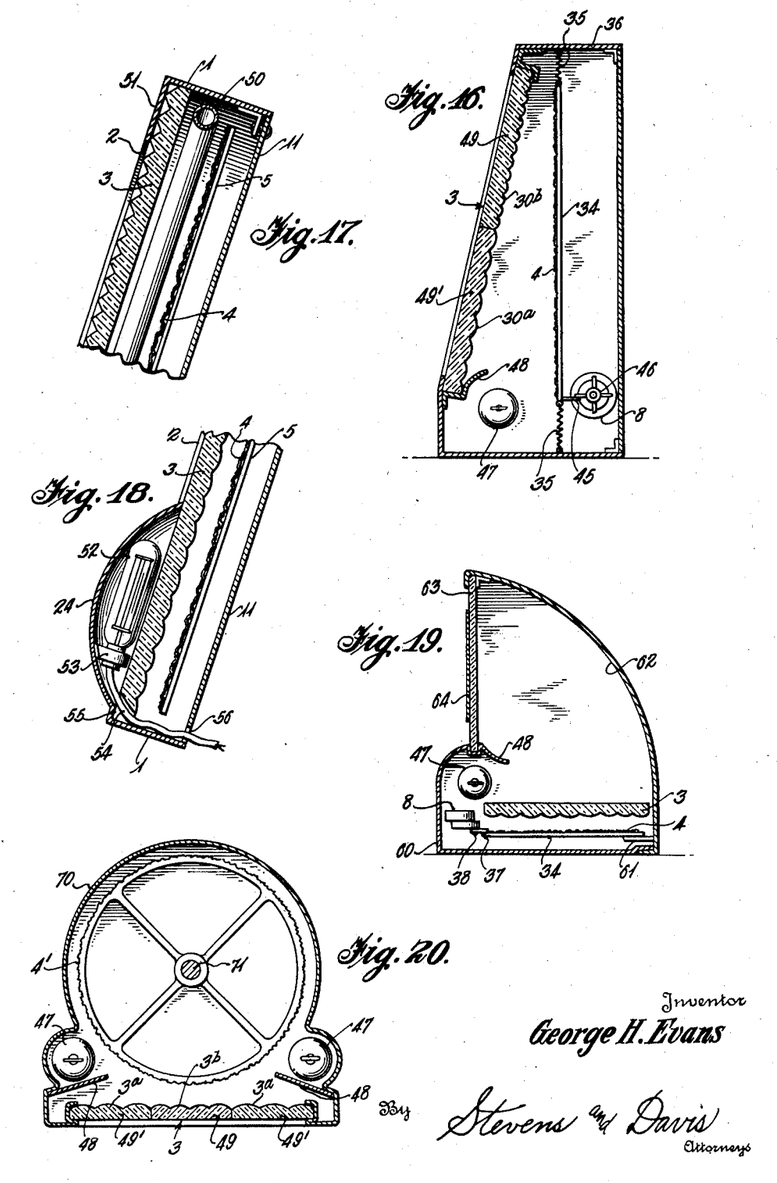
Figure 16 is a view in cross-section on a vertical plane of a modification wherein the reflector is moved irregularly.
Figure 17 is a fragmentary view in cross-section of a sign similar to that shown in Figure 2 but having a neon tube located between the screen and reflector.
Figure 18 is a fragmentary view in cross-section of a modification, similar to that shown in Figure 3, having a light source positioned behind the cover plate.
Figure 19 is a view in cross-section on a vertical plane of a modified unit incorporating a stationary reflector for projecting the illuminated image received from the screen.
Figure 20 is a view in cross-section of a modification comprising a reflector in the form of a drum.

Still another movement may be effected by an arrangement such as shown in Figure 16. In this modification the reflector 4 carried by the frame 34 may be supported by helical springs 35 extending from opposite or all edges of the reflector 4 to the housing 36. The frame 34 may be provided with an arm 45 extending at an angle therefrom and arranged to lie in the path of the paddle wheel 46 which may be driven by the motor 8. As the arm 45 is contacted by the fins of the paddle wheel 46, the reflector will be caused to move both downwardly and laterally. After the arm 45 has been released by the continued rotation of the wheel 46 the reflector will resiliently jiggle in an erratic manner until the arm 45 is contacted by the next fin of the wheel 46.

In addition to the variation in movement of the reflector 4, other modifications are shown in Figure 16. It has been found desirable to incorporate a source of light so as to insure adequate and proper illumination at all times. Accordingly, a light source 47 may be positioned along one edge of the reflector 4 and between said reflector and the screen 3. A space for this light source 47, which may be adjacent any of the edges of the screen 3 and reflector 4, may be provided by mounting the members at an angle with respect to each other and positioning the light source 47 opposite the apex of said angle. A light shield 48 may be provided to prevent light rays from projecting directly upon the screen 3.

When the screen 3 and reflector 4 are mounted at an angle it is desirable to provide optical compensation so that the image may be substantially in focus over the entire area. This compensation may readily be secured by providing optically effective units 30a of greater focal length on the portions of the screen 3 which are spaced at a greater distance from the reflector 4, and units 30b of shorter focal length where the screen 3 and reflector 4 are closer together. In other words the focal length of the optically effective units 30 may be progressively increased or decreased as the distance between the screen 3 and reflector 4 is varied. It would be preferable to have these varying optical units integral with a single sheet but this would require special manufacturing processes. Accordingly, for convenience and reduction of cost the screen 3 may be constructed mosaically and comprise two or more sheets 49 and 49' having optical units of different focal length thereon.

Light sources may also be provided for the first described modifications as shown in Figures 3, 17 and 18. In Figure 3 a neon tube 50 is shown, in broken lines, behind the mask 24. The tube may be located between the mask 24 and the screen 3, or between the screen 3 and the reflector 4. Another arrangement of the neon tube 50 is shown in Figure 17 wherein said tube is located between the screen 3 and the reflector 4 and around the circumference or edges thereof. The neon tube 50 may be shielded from direct visibility by the mask 23, shown in Figure 1, or the front wall 51 of the housing 1, surrounding the opening 2, may extend inwardly sufficiently to form a mask. A modification of the arrangement wherein the light source is located behind the mask 24 is shown in Figure 18. The mask 24 may be dished to provide room between said mask and the screen 3 for an incandescent bulb 52. The bulb 52 may be mounted within a socket 53 carried by the mask, and a conductor 54 may pass through a channel 55 in the screen 3, and through an opening 56 in the rear wall 11 of the housing 1 to the back of the sign and a suitable source of power.

A modified sign, as shown in Figure 19, may incorporate a reflecting surface to project the images formed by the screen. The screen 3 and reflector 4 may be mounted horizontally in the base of a housing 60. The reflector 4 may be mounted on a frame 34, as shown in Figure 15, and may be slidingly supported along one edge by a guide 61, and at the opposite edge by a pin 37 connected to the oscillating drive 38, which is mounted on the motor 8. A light source 47 may extend along one edge of the screen 3 so as to cast light rays down through said screen 3 to the reflector 4. The rays may then be reflected back through the screen 3 and upwardly to a reflecting surface 62, which is preferably highly polished and may be integral with the housing 60. The images are reflected, by this surface 62, outwardly through a panel 63 which may support indicia 64. The panel 63 may be transparent or translucent and may be colored. Likewise, the indicia 64 may be opaque, transparent or translucent, and colored. A mask 48 may be arranged to prevent light from traveling directly from the source 47 to the reflecting surface 62.

Another modification is shown in Figure 20. In this arrangement the reflector may comprise a drum 4' mounted on a shaft 71 within a column-like housing 70. Elongated light sources 47 may extend along the opposite sides of the front of the reflector 4'. A mosaic screen 3 may be positioned in front of the reflector 4' and masks 48 may be provided to shield the screen 3 from the light sources 47. As described in connection with Figure 16, the screen 3 may be formed by separate sheets 49 and 49'. The center sheet 49 closest to the surface of the reflector 4' may be provided with short focus lenses 3b, and the adjacent sheets 49', which are spaced farther from the reflector 4' may be provided with longer focus lenses 3a.

Figure 21:
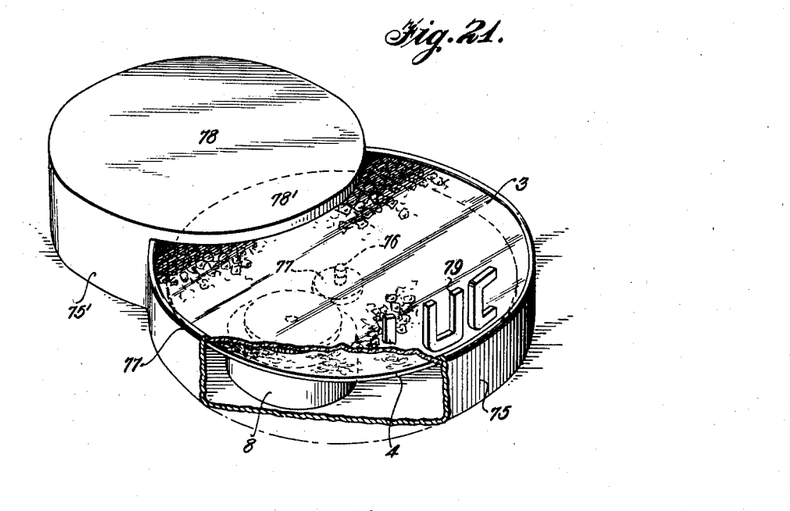
Figure 21 is a view in perspective of a display stand incorporating the present invention, portions being broken away to show the arrangement of parts.

The present invention is highly suitable for displays, merchandise stands, and the like as well as for advertising signs. A merchandise display unit is shown in Figure 21 wherein the reflector 4 is rotatably mounted beneath a screen 3 which is supported in substantially a horizontal position by a housing 75. The reflector 4 may be supported on a shaft 76 which is in communication with the motor 8 by means of a gear train 77 or the like. The housing 75 may be provided with a rearward extension 75' which is arranged to support a merchandise supporting table 78. The table 78 may be spaced from the screen 3 so that a light source may be mounted beneath to overhanging portion 78' and cast light rays down through the screen 3 to the reflector 4. Indicia 79 may be mounted on the screen 3 if desired. The indicia may comprise transparent or translucent blocks, that may be removably located on said screen. Consequently, there will be an animated edge glow effect through the indicia 79 caused by the reflection upwardly therethrough from the reflector 4.

Figure 22:
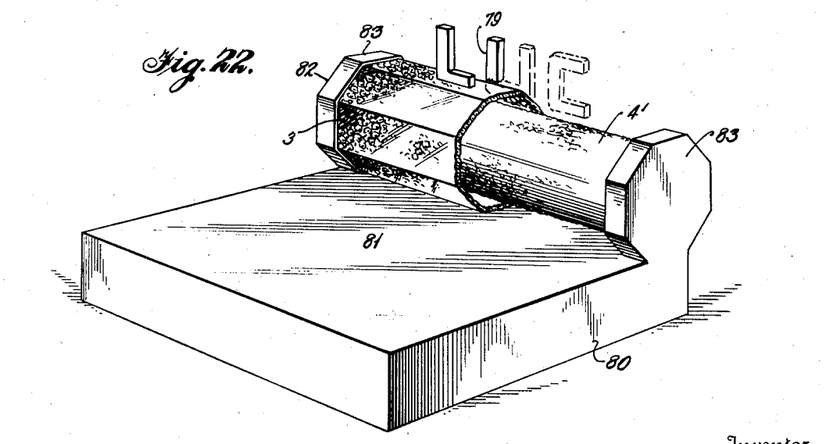
Figure 22 is a view in perspective of a modified display stand incorporating a drum reflector, portions being broken away to show the reflector.

A modification of a display unit incorporating the principles of the present invention is shown in Figure 22. This unit may be in the form of a merchandise stand which may comprise a housing 80 having an upper surface 81 and supporting a horizontal illuminating column 82. This column 82 may include supporting end portions 83 and may comprise a glass tube or may be formed by a plurality of screens 3 arranged, for instance, in an octagonal formation as shown. A circular rotatable reflecting member 4', such as shown in Figure 20, may be enclosed within the screen column 82 so that the light penetrating the column 82 may be reflected out by the reflector 4'. The column 82 may be vertically mounted on the base housing 80, which also may contain a motor for rotating said reflector. This type of construction is adapted to be associated with a sign or for the display of merchandise to draw the attention of an observer thereto. Indicia 79 may be removably mounted on the housing 80 or upon the column 82 as shown, and may be transparent or translucent as hereinbefore described.

It is to be noted that throughout the many modifications as hereinbefore described, the essence of the invention lies in means for deforming or readjusting light rays so as to produce a light pattern without actual physical conformation. Likewise, it is desirable to disguise the physical conformation of the means for causing this pattern. The effect may be obtained by the combination of an irregular reflecting surface with an optically deformed screen for further deflecting and refracting light rays. Similarly, various types of light sources and indicia may be incorporated to present different effects.

Many different effects may be produced by the use of the various types of reflectors above described in combination with the various types of screens hereinbefore mentioned. In addition, the manner in which the illumination is provided and the reflectors employed, positioned and/or driven may greatly vary the effect produced. In constructing a sign according to the present invention, the type of reflector and/or type of screen to be incorporated therein may be chosen according to the type of matter to be advertised, the location of the sign with respect to its surroundings, and the location of the sign with respect to the observers.

Although certain specific embodiments of the present invention have been shown and described, many modifications thereof are possible, and the present disclosure should be construed only in an illustrative sense. The present invention, therefore, is not to be restricted except insofar as is necessitated by the prior art and by the spirit of the appended claims.

I claim:

1. Apparatus for display and advertising purposes, comprising in combination a screen and a reflector adapted to move with respect thereto, said screen comprising a sheet that is transparent to light rays and having optically effective formations thereon adapted to refract light rays, said reflector comprising a relatively flat member formed of metal foil the reflecting surface of which is formed into a plurality of angularly disposed reflecting facets and a source of light for illuminating said reflector, said light source being arranged to substantially surround said reflector and located between said screen and said reflector, the optically effective formations of said screen and said angularly disposed reflecting facets cooperating to receive and direct light rays at substantially all angles and to produce variable patterned illuminating effects.

2. Apparatus for display and advertising purposes, comprising in combination a screen and a reflector adapted to move with respect thereto, said screen comprising a sheet that is transparent to light rays and having optically effective formations thereon adapted to refract light rays, said reflector comprising a relatively flat member the reflecting surface of which is formed into a plurality of angularly disposed reflecting facets, a mask for covering a portion of said screen, and a source of light for illuminating said reflector, said light source being located between said mask and said screen, the optically effective formations of said screen and said angularly disposed reflecting facets cooperating to receive and direct light rays at substantially all angles and to produce variable patterned illuminating effects.

3. Apparatus for display and advertising purposes, comprising in combination a screen and a reflector adapted to move with respect thereto, said screen comprising a sheet that is transparent to light rays and having optically effective formations thereon adapted to refract light rays, said reflector comprising a relatively flat member the reflecting surface of which is formed into a plurality of angularly disposed reflecting facets, a mask for covering a portion of said reflector, and a source of light for illuminating said reflector, said light source being located behind said mask, the optically effective formations of said screen and said angularly disposed reflecting facets cooperating to receive and direct light rays at substantially all angles and to produce variable patterned illuminating effects.

GEORGE H. EVANS.